United States Patent [19]

Ippolito

[11] Patent Number: 4,514,098
[45] Date of Patent: Apr. 30, 1985

[54] WOUND WIRE BEARING
[75] Inventor: Rodolfo M. Ippolito, Euless, Tex.
[73] Assignee: Dresser Industries, Inc., Dallas, Tex.
[21] Appl. No.: 413,774
[22] Filed: Sep. 1, 1982
[51] Int. Cl.³ .................... E21B 10/22; E21B 10/24; E16C 33/10
[52] U.S. Cl. ................................ 384/95; 384/93; 384/292
[58] Field of Search ............... 384/95, 93, 295, 293, 384/292, 278, 282, 283, 289, 291, 301, 378; 308/4 R

[56] References Cited

U.S. PATENT DOCUMENTS

| | | | |
|---|---|---|---|
| 1,200,060 | 10/1916 | Wemp | 384/292 |
| 1,398,220 | 11/1921 | Acheson, Jr. | |
| 1,454,682 | 5/1923 | Layne | 384/292 |
| 1,600,961 | 9/1926 | Payne | |
| 2,664,321 | 12/1953 | Noble | 308/8.2 |
| 2,667,389 | 1/1954 | Smith | 384/292 |
| 3,178,239 | 4/1965 | Zeller | 384/282 X |
| 3,235,316 | 2/1966 | Whanger | 308/8.2 |
| 4,189,985 | 2/1980 | Harris | 384/291 X |
| 4,257,654 | 3/1981 | Keepers | 308/8.2 |

Primary Examiner—Stuart S. Levy
Assistant Examiner—Thomas R. Hannon
Attorney, Agent, or Firm—Fred A. Winans

[57] ABSTRACT

In accordance with an illustrative embodiment of the present invention, a bearing positioned between the rolling cutter or cone and the bearing pin of a rock bit comprises wound wire such as a closed helical coil spring that provides spaced-apart bearing surfaces with open areas therebetween. The flexibility of the helical spring tends to spread the load between several bearing areas to thereby reduce concentrations of stress and the occurrence of localized high temperatures and wear, and the spacing of the bearing surfaces provides wear and contamination particle traps as well as lubricant reservoirs, to significantly increase the useful life of the bearing.

14 Claims, 8 Drawing Figures

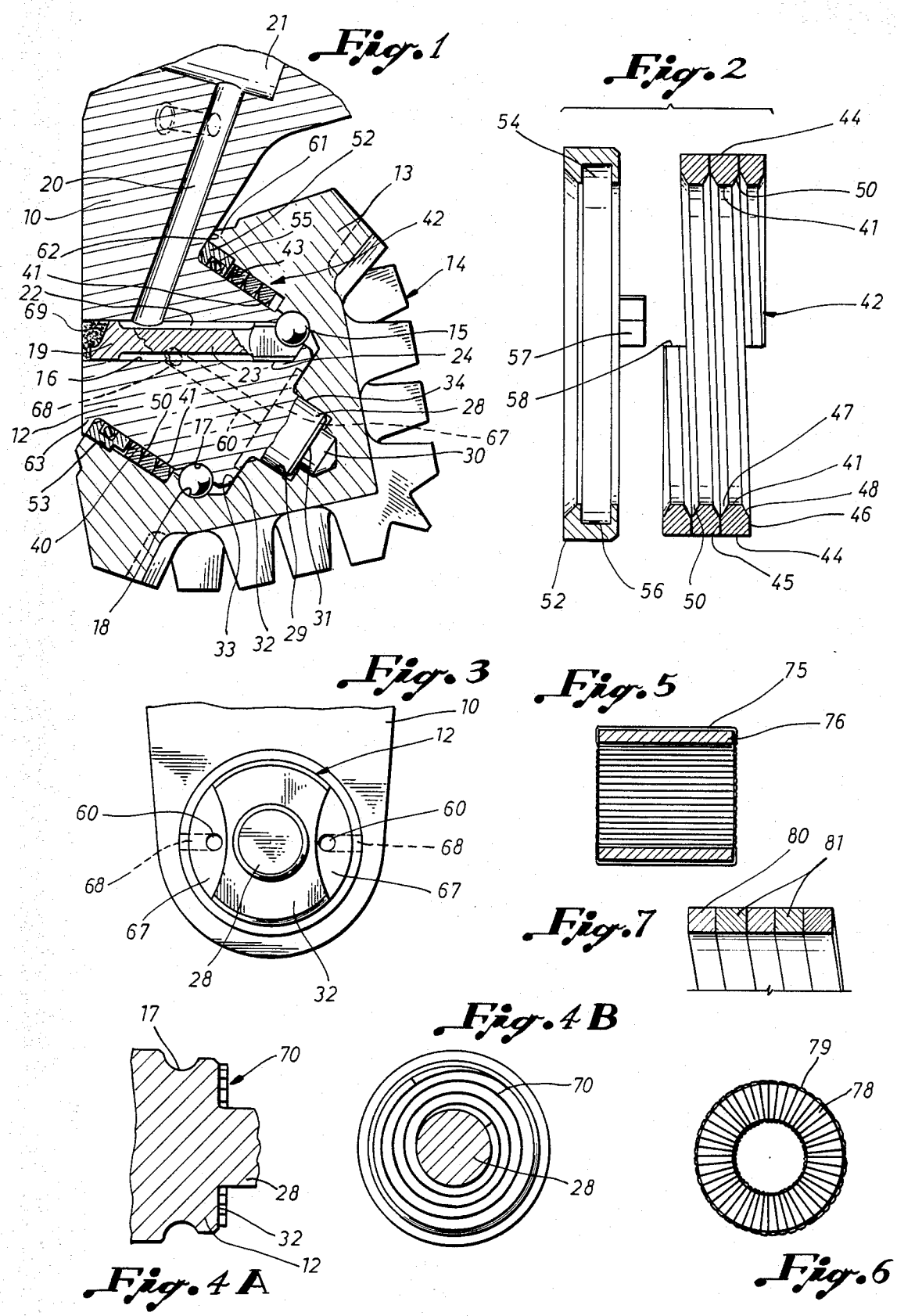

WOUND WIRE BEARING

FIELD OF THE INVENTION

This invention relates generally to journal or friction bearing structures, and specifically to a new and improved journal bearing for a rolling cone rock bit or roller rock cutter used in drilling well bores.

BACKGROUND OF THE INVENTION

A typical friction or journal bearing used in rock bits, as shown for example in U.S. Pat. No. 4,178,045, has opposed cylindrical surfaces formed on stepped diameter sections of the bearing pin and cone. The surfaces oppose and engage one another as the bit is turned on bottom under load applied by the drill collar string to which the bit is attached. Due to heavy loads that are imposed on the bearings during normal drilling operations, significant amounts of friction and heat are generated which limit the bearing life. Of course it is desirable that the bearing life equal or exceed the life of the cone cutting structure, so that the drill string will not have to be tripped to change the bit before the cutting structure has been worn out.

The usual approach to design of bearings of this type has been to maximize the nominal bearing surface areas within the confines of the structural integrity of the rolling cutters or cones, with the objective of presenting larger and more dispersed contact areas at the load-bearing points. Such bearing structures are susceptible to early damage by contaminant particles or by small particles of metal dislodged as a result of the wearing process which adhere to the hearing surfaces and greatly accelerate the wearing process toward catastrophic failure. There is a need for trapping such particles so that they do not remain between rubbing bearing surfaces. Yet another shortcoming of prior structures is that the plain bearing surfaces have not been sufficiently lubricated to provide for maximum bearing life in the somewhat hostile environment in which drill bits are used. Although helical grooves in solid bearing members have been suggested heretofore, such structures have limited compliance and are easily worn and damaged at areas of localized concentration of stress and localized high temperatures.

A general object of the present invention is to provide a new and improved friction or journal bearing structure of the type described having a significantly improved bearing life.

Another object of the present invention is to provide a new and improved rock bit journal bearing that includes open areas for trapping debris particles so that such particles do not interfere with movement between opposed bearing surfaces.

Another object of the present invention is to provide a new and improved rock bit journal bearing constructed and arranged to provide large spaces adjacent to engaged bearing surfaces for the storage of lubricant and supply thereof to contacting bearing surfaces to reduce wear.

Another object of the present invention is to provide a new and improved bearing structure which functions to pump lubricant as one bearing member rotates relative to the other to provide a continuous supply of lubricant to bearing contact areas.

Another object of the present invention is to provide a new and improved rock bit journal bearing constructed and arranged to provide a wiping action of one bearing member over the other to evenly distribute lubricant and thereby reduce wear.

Still another object of the present invention is to provide a new and improved journal bearing structure having spaced bearing surfaces formed by wound wire capable of accommodating some degree of misalignment of parts.

SUMMARY OF THE INVENTION

These and other objects are attained in accordance with the concepts of the present invention through the provision of a journal or friction bearing structure, particularly useful in a rock bit, where at least one of the opposed bearing members comprises wound wire forming spaced surface areas in actual contact with the surface of the other bearing member. The cross-sectional shape of the wire, which can take numerous forms, is designed such that between the spaced bearing surface areas there are provided recessed regions which form lubricant reservoirs as well as traps for debris such as particles that are dislodged from the bearing surfaces during operation, or which enter the bearing as contamination.

In one embodiment, the wound wire is in the form of a closed helical coil spring that is mounted in an interior bore of the cone to provide a radial bearing. The cross-sectional outline of the coils of the spring is defined by radially outer side walls that engage companion side walls of adjacent coils, and radially inner side walls that converge toward one another to provide axially spaced, inwardly facing bearing surfaces in actual contact with the outer cylindrical surface of the bearing pin. The helical space defined between the inclined inner wall surfaces of adjacent coils provides large areas for containment of lubricant as well as large trap spaces for loose particles. The helical form of the wire spring bearing provides a pumping action as the cutter rotates on the bearing pin so that lubricant is moved axially along the bearing, and so that the bearing contact areas are constantly changing during such rotation. The bearing pin may be provided with passages to enable continuous circulation of lubricant. Also, passages may be provided leading to the lubricant reservoir. Means are provided for preventing rotation of the coil spring with respect to the cone within which it is positioned. Such means can take the form of a ring pressed into a counterbore at the outer face of the cone which has an axially directed projection in engagement with one end of the coil spring. However, it is to be understood that the wound wire bearing could also be made stationary with respect to the bearing pin.

As previously mentioned, the wound wire can have numerous cross-sectional shapes provided that two principal conditions are met: the surface areas thereof which are in actual contact with opposed surfaces of the other bearing member are spaced apart in order to reduce the bearing contact area; and areas or regions are provided between such spaced bearing surface areas for trapping debris particles and for the presence of lubricant, which could be of the solid form. In general, if one envisions a radial journal bearing as including a stationary member and a rotating member, with the rotating member having a wound wire form, the rotating member will be in continuous contact with the stationary member at points which an instant before contact were exposed to lubricant. The points of contact on the stationary member are, therefore, continuously changing and moving axially along the stationary member. Such movement of the points of contact allows utilization of the entire bearing surface area of the stationary member and the distribution of wear evenly across its length even though the bearing surface contact area at any instant has been substantially reduced. Another benefit of this wiping action of the rotating member over the stationary member is the displacement or pumping of lubricant which can take place to and from the lubricant reservoir or other parts of a rock bit through suitable lubricant passages. A principal advantage of such lubricant circulation is the reduction of wear and bearing operating temperatures, thereby prolonging the life of a rock bit. Of course the direction of lubricant circulation is determined by the right or left hand winding of the spring coils and by the direction of relative rotation between the bearing members. Moreover it will be recognized that the coiled form of the wire bearing provides a certain amount of self-aligning capability to maintain a substantial contact area and avoid point loads or points of high stress concentration, local high temperatures, and localized wear over the life of the bearing. The inherent flexibility of the coils tends to spread the load among several separated bearing areas, since each coil turn can be considered to have a degree of freedom for independent motion in the radial and circumferential directions. It also should be noted that since coil springs are readily available and somewhat inexpensive items, the present invention provides a very cost effective bearing structure compared to prior art structures and techniques for making drill bit bearings where special hard metal inlays and hard facings have resulted in higher bit costs.

BRIEF DESCRIPTION OF THE DRAWINGS

The present invention has other objects, features and advantages which will become more clearly apparent in connection with the following detailed description of one or more preferred embodiments, taken in conjunction with the appended drawings in which:

FIG. 1 is a vertical sectional view of the arm, bearing pin and cone of a rock bit that incorporates a bearing structure constructed in accordance with the present invention;

FIG. 2 is an enlarged and exploded view of the spring bearing element and seal cage ring of the bearing structure of FIG. 1;

FIG. 3 is an end view of the bearing pin shown in FIG. 1, with the cone removed;

FIGS. 4A and 4B are respective side section and front views of a thrust bearing employing a spiral wound wire;

FIG. 5 is a vertical sectional view of a radial friction bearing where wire is wound in an axial direction on a tubular bushing;

FIG. 6 illustrates a thrust bearing arrangement where wire is wound in a radial direction on a washer; and FIG. 7 is an enlarged fragmentary view of wire bearing having spaced coils with solid lubricant therebetween.

DESCRIPTION OF PREFERRED EMBODIMENTS

Referring initially to FIG. 1, the depending arm 10 of a drill bit body has an inwardly extending journal bearing pin 12 formed integrally therewith. A rotary cutter element or cone 13 is rotatably mounted on the bearing pin 12, and has a suitable cutting structure indicated generally at 14 on its outer periphery. The cutting structure 14 can have milled teeth as shown, or tungsten carbide inserts, or any other cutter elements capable of penetrating the rock and making hole as the drill bit is turned on bottom by the drill string. Of course the typical rock bit has a pluality of such arms, pins and cones, however a single assembly has been illustrated for purposes of explaining the structure and operation of the present invention. The cone 13 is retained on the bearing pin 12 by suitable means such as a pluality of balls 15 that are inserted through a ball passageway 16 and into position between opposed annular raceways or grooves 17 and 18 formed in the bearing pin 12 and the cone 13, respectively. A ball plug 19 subsequently inserted into the passageway 16 and secured to the arm 10 functions to retain the balls 15 in the raceways. Of course other means of cone retention may be employed. A passage 20 that leads from a lubricant chamber 21 to the ball passageway 16 enables a supply of lubricant to reach the annular area 22 between the central region 23 of the ball plug 19 and to be communicated past the head 24 of the plug to the various clearances and bearing surfaces between the pin and cone. These passages and a suitable pressure transmitting element (not shown) located in the reservoir 21 and an O-ring seal 55 enable the pressure of the lubricant to be substantially equalized with that of the drilling fluid outside the drill bit body.

The inner end portion 28 of the bearing pin 12 has a reduced diameter cylindrical configuration to provide a pilot pin that fits into a counterbore 29 in the cone 13. A thrust button 30 that is press fitted into the lowermost cavity of the cone 13 engages the end face 31 of the pilot pin 28. The thrust button 30 and the axially opposed faces 32 and 33 on the end of the bearing pin 12 and the cone 13 carry thrust loading during operation of the bit. The outer surface 34 of the pilot pin 28 opposes and engages the mating inner cylindrical wall surface of the bore 29 of the cone 13 to provide a nose or radial bearing.

In accordance with the present invention, the principal bearing structure by which the cone 13 is rotatably mounted on the bearing pin 12 comprises a closed, helical coiled spring 42 that is received in a counterbore 43 in the cone 13 terminating a radially extending shoulder. The coil spring 42 is constructed as will be described in more detail to have axially spaced inner bearing surfaces 41 that oppose and engage the outer cylindrical wall surface 40 of the bearing pin 12. The spring 42 preferably is made of a material having good bearing characteristics such as resistance to wear and anti-seizing and anti-galling properties. Such a material could be, for example, beryllium copper. The spring 42 preferably has an outer diameter sized such that it must be press fitted into the counterbore 43 so that the interference aids in preventing relative rotation between the parts. This press-fitting engagement results in a degree of deformation of the outer diameter of the spring with a corresponding deformation of the inner diameter to define the dimension of the bearing surface. As shown in FIG. 2, the coil spring 42 has a cross-sectional outline defined by outer and inner annular wall surfaces 44 and 41, radially outer side walls 45 and 46, and inwardly converging side walls 47 and 48. The shape of the spring coil provides a helical space 50 between coils adjacent the bearing surface 40 on the pin 12. Since the bearing spring 42 is wound on a helix, the inner wall surfaces 41 thereof, as well as the space 50, may be considered to be constantly moving axially relative to the bearing surface 40 of the pin 12 as the cone 13 rotates thereon.

A seal cage and retainer ring 52 that is press-fitted into an outer counterbore 53 of the cone 13 has an internal groove 54 machined therein which receives a suitable elastomer seal 55 such as an O-ring. The seal 55 is compressed between the outer wall 56 of the groove 54 and the outer surface 40 of the bearing pin 12 with a squeeze sufficient to seal off and thus maintain the lubricant within the bearing. As shown in FIG. 2, the inner side of the ring 52 has an axially projecting lug 57 formed thereon which engages the end face 58 of the coil spring 42 to assist in preventing rotation of the spring relative to the cone 13. The spring is axially retained between the radial shoulder of the counterbore and the radially extending retainer ring. The outer face of the ring 52 and the radially adjacent portion 61 of the cone 13 rotate adjacent the last-machined surface 62 of the arm 10, with the lower region of the arm defining a shirttail 63.

Since the coils of the bearing spring 42 extend on a helix, the axial movement of the inner surfaces 41 relative to the bearing surface 40 of the pin 12 provides a pumping action for moving lubricant axially along the bearing to maintain a continuous film of lubricant between opposed surfaces. To enable circulation of the lubricant, diametrically opposed, axially extending passages 60 are formed in the pin 12 as shown in FIGS. 1 and 3. The lower ends of the passages 60 communicate with substantial clearance spaces provided by flats 67 formed in the end face 32 of the pin 12, and the upper ends of the passages are communicated with the exterior of the pin by radially drilled holes 68 that intersect the bearing surface 40 adjacent the interface between the upper end of the bearing spring 42 and the retainer ring 52. Thus as the cone 13 rotates during drilling, lubricant is circulated along the bearing surface 40 toward the seal 55 where it enters the holes 68 and passes via the passages 60 and the clearances provided by the flats 67 to the region around the balls 15 and returns to the lower end of the surface 40 where it is recirculated in a continuous manner.

The bit is assembled by press-fitting the thrust button 30, the bearing spring 42 and the retainer ring 52 into the cone 13, which establishes the inner diameter of the spring and defines the journal bearing surface 41 thereof, and then fitting of the cone assembly, with the O-ring 55 positioned in the groove 54, onto the bearing pin 12. The balls 15 then are inserted via the passageway 16 to the raceways 17, 18, and the ball plug 19 is inserted into the passageway and fixed therein by means such as a weld 69 on the outer end thereof. All vacant spaces in the bearing are filled with a suitable lubricant in a manner well known to those skilled in the art. As the cones 13 turn on bottom, superior performance relative to plain journal bearings is obtained due to the following factors. A wiping action of the spring 42 over the journal continuously changes the points of contact between the surfaces 41 and the surface 40. Substantial debris traps are provided by the regions 50 between the radially inner side walls of adjacent spring coils, which regions also function as lubricant reservoirs. A pumping action is produced by rotation of the spring 42 on the pin 12 which results in lubricant recirculation. The coils of the spring 42 have a certain amount of self-aligning capability to accommodate cocking of the cone on the bearing pin due to tolerances and to the non-uniform way in which load is applied and also due to wear which occurs in the pilot pin region of the bearing. It will be noted that adjacent bearing surface areas of the spring enjoy some freedom to translate relative to each other radially, axially and circumferentially, whereas in prior art using grooved cylinders, only relative motion due to bending has been accommodated.

Although a closed, continuous coil spring is considered to be the preferred form of the present invention, other forms and types of coil springs and other shapes of coiled wire could be used so long as axially spaced bearing areas separated by debris traps/lubricant reservoir areas are provided. For example, the coils of the spring could be discontinuous or segmented so that the composite bearing would be constituted in the form of stacked lock washers or the like. It also is within the scope of the present invention to locate the wire bearing on the pin so that it opposes and engages an inner bearing surface on the cone 13. A similarly arranged bearing structure can be used at the nose bearing. Moreover, wound wire on both the bearing pin and cone, and radially stacked coils of wire on either or both of the members, is within the scope of this invention.

An axial or thrust bearing may be provided to operate between the thrust flange faces 32 and 33 (FIG. 1) of the bit as shown in FIGS. 4A and 4B. Here the bearing structure comprises a spiral wound wire member 70 that is positioned on one face so that it opposes and engages the other face. When considered in cross section taken on a radial line, the spiral spring 70 will present spaced surface areas that engage the bearing surface of the other member, with combination debris trap-lubricant spaces being provided between such spaced surface areas. The spiral wound bearing 70 preferably is fixed against rotation relative to one thrust flange face by means of a press fit, or any other suitable means so as to maximize the pumping of lubricant. The pumping or movement of lubricant can be biased in a direction from the inner area of the bearing toward the outside or from the outside toward the inner area, depending upon right hand or left hand winding of the spiral coils and the direction of relative motion between the thrust bearing members. Of course as in the case of the wound wire radial bearing, the wound wire thrust bearing does not have to be fixed with respect to one of the bearing members. Bearing materials can be selected and bearing surfaces can be textured in such a way to predetermine the amount of friction between the members, and thus the amount of relative rotation or floating action of the wound wire bearing according to the operating or service conditions.

FIG. 5 illustrates how wire 75 can be wound in an axial direction on a tubular bushing 76 to provide a radial bearing. The wound wire bushing would then be positioned in the counterbore 43 of the cone 13 to surround and engage the outer surface 40 of the bearing pin 12. The resulting bearing surface can be either the outer diameter or the inner diameter of the wound wire bushing 76, or both.

Another form of thrust bearing made of wound wire is shown in FIG. 6. Here a circular element such as a flat washer 78 has wire 79 wound radially thereof with either the front or the back face or both providing the resultant bearing surfaces. Such a bearing construction could be used between the thrust flange faces of a rock bit, as well as between the lower end of the bearing pin and the thrust button.

Another embodiment of the present invention can take the form of a wound wire radial spring bearing of the compression type having a square cross section as shown in FIG. 7 at 80. The regions between adjacent spring coils serve as debris traps and lubricant reservoirs, and such regions can be filled either partially or completely with a solid lubricant 81. The solid lubricant 81 may be a non-metal or a soft metal such as silver. Such solid lubricant will tend to be squeezed out of the regions between adjacent spring coils due to axial forces resulting from rotational friction to produce an effective and unique lubricating action on the companion bearing member. Furthermore, debris particles resulting from the wear process will tend to embed themselves in the solid lubricant.

It now will be recognized that a new and improved wound wire friction bearing structure has been provided that has general application and is particularly useful in rock bits. Since certain changes or modifications may be made in the disclosed embodiments without departing from the inventive concepts involved, it is the aim of the appended claims to cover all such changes and modifications falling within the true spirit and scope of the present invention.

The embodiments of the invention in which an exclusive property or privilege is claimed are defined as follows:

1. An earth boring member defining:
    a body having a journal pin providing a first cylindrical surface;
    a rotary cutter having an internal axially extending recess defining a second cylindrical surface for receipt therein of said first cylindrical surface;
    journal bearing means interposed between said cylindrical surfaces for rotatably supporting said cutter on said pin, said means defining a sleeve-like member having an inner annular surface and an outer annular surface with one of said annular surfaces, prior to assembly, having a diameter requiring resilient deformation of said member upon assembly for positive non-rotative engagement with one of said cylindrical surfaces, such deformation thereby defining a corresponding deformation of the other of said annular surfaces for defining the diameter of a bearing surface in rotational bearing engagement with the other cylindrical surface; and,
    axially opposed shoulder means extending radially from said cylindrical surface and abutting opposite axial ends of said bearing member to prevent axial movement of said bearing member with respect to said cylindrical surface; and wherein said journal bearing means comprises:
        an axially helically wound wire member forming a series of helical turns, each turn providing a bearing surface independently translationally moveable with respect to the bearing surface of the next adjacent turn and said bearing surface of adjacent turns defining an axial space therebetween providing a lubricant reservoir.

2. Structure according to claim 1 wherein one of said radially extending shoulders further defines means abutting said bearing member in driving engagement therewith whereby said bearing member is maintained positively stationary with respect to said one cylindrical surface.

3. Structure according to claim 2 wherein said one cylindrical surface is a cylindrical surface of said cutter recess and whereby said wound wire bearing member is radially compressed upon assembly therein for driving engagement by said cutter and wherein:
    one of said radially extending shoulder members comprises a retainer ring pressed into said cone cavity and having an axially extending portion for abutting one end of said bearing member.

4. Structure according to claim 3 wherein said axial space between adjacent bearing surfaces of adjacent helical turns is continuous throughout the wound wire bearing member.

5. Structure according to claim 4 wherein said retainer ring includes an internal radially open groove, open to said journal pin, and resilient seal means disposed within said groove for sealing engagement between said retainer ring and said pin.

6. The apparatus of claim 5 wherein said rotary cutter is a cone having a cutting structure on the exterior surface thereof adapted for drilling a borehole in the earth and said opposed shoulder means comprises said retainer ring and an internal shoulder of said recess.

7. Structure according to claim 4 wherein said axial space is at least partially filled with a solid lubricant.

8. The bearing structure of claim 4 wherein motion of said wound wire relative to said other cylindrical surface causes displacement of lubricant along said bearing surface, and further including passage means in said journal pin for enabling recirculation of lubricant that is displaced along said bearing surface.

9. An earth boring member defining:
    a body having a journal pin providing a first cylindrical surface;
    a rotary cutter having an internal axially extending recess defining a second cylindrical surface for receipt therein of said first cylindrical surface;
    journal bearing means interposed between said cylindrical surfaces for rotatably supporting said cutter on said pin, said means defining a sleeve-like member having an inner annular surface and an outer annular surface with one of said annular surfaces, prior to assembly, having a diameter requiring resilient deformation of said member upon assembly for positive non-rotative engagement with one of said cylindrical surfaces, such deformation thereby defining a corresponding deformation of the other of said annular surfaces for defining the diameter of a bearing surface in rotational bearing engagement with the other cylindrical surface; and,
    axially opposed shoulder means extending radially from said one of said cylindrical surfaces and in close axial proximity to opposite axial ends of said bearing member to limit axial movement of said bearing member with respect to said one of said cylindrical surfaces; and wherein said journal bearing means comprises:
        an axially helically wound wire member forming a series of helical turns, each turn providing a bearing surface independently translationally movable with respect to the bearing surface of the next adjacent turn and said bearing surface of adjacent turns defining an axial space therebetween providing a lubricant reservoir.

10. Structure according to claim 9 wherein one of said radially extending shoulders further defines means abutting said bearing member in driving engagement therewith whereby said bearing member is maintained positively stationary with respect to said one cylindrical surface.

11. Structure according to claim 10 wherein said one cylindrical surface is a cylindrical surface of said cutter recess and whereby said wound wire bearing member is radially compressed upon assembly therein for driving engagement by said cutter and wherein:

one of said radially extending shoulder members comprises a retainer ring pressed into said cone cavity and having an axially extending portion for abutting one end of said bearing member.

12. Structure according to claim 11 wherein said axial space between adjacent bearing surfaces of adjacent helical turns is continuous throughout the wound wire bearing member.

13. Structure according to claim 12 wherein said retainer ring includes an internal radially open groove, open to said journal pin, and resilient seal means disposed within said groove for sealing engagement between said retainer ring and said pin.

14. Structure according to claim 12 wherein said axial space is at least partially filled with a solid lubricant.

* * * * *